United States Patent [19]

Uchida et al.

[11] Patent Number: 4,852,462

[45] Date of Patent: Aug. 1, 1989

[54] OPERATING NOISE-FREE FLUID FLOW DISTRIBUTOR CIRCUIT FOR VARIABLE ASSIST POWER STEERING SYSTEM

[75] Inventors: Koh Uchida, Sagamihara; Takashi Kurihara, Atsugi; Makoto Miyoshi, Kawasaki, all of Japan

[73] Assignee: Nissan Motor Co., Ltd., Yokohama, Japan

[21] Appl. No.: 151,121

[22] Filed: Feb. 1, 1988

[30] Foreign Application Priority Data

Jan. 30, 1987 [JP] Japan .................................. 62-19783

[51] Int. Cl.$^4$ ............................................. F15B 9/10
[52] U.S. Cl. ..................... 91/375 A; 91/443; 137/596.12; 137/625.24; 180/142; 180/143
[58] Field of Search ................ 91/375 R, 375 A, 437, 91/443; 137/596.12, 625.24; 180/142, 143

[56] References Cited

U.S. PATENT DOCUMENTS

| | | | |
|---|---|---|---|
| 4,465,098 | 8/1984 | Bacardit | 137/625.21 |
| 4,512,238 | 4/1985 | Bacardit | 91/370 |
| 4,561,516 | 12/1985 | Bishop et al. | 180/142 |
| 4,561,521 | 12/1985 | Duffy | 180/142 |
| 4,565,115 | 1/1986 | Bacardit | 91/375 A |
| 4,570,735 | 2/1986 | Duffy | 180/142 |
| 4,594,936 | 6/1986 | Bacardit | 91/375 R |
| 4,619,339 | 10/1986 | Futaba et al. | 180/143 |
| 4,632,204 | 12/1986 | Honaga et al. | 180/142 |
| 4,672,885 | 6/1987 | Kervagoret | 91/450 |

FOREIGN PATENT DOCUMENTS

| | | |
|---|---|---|
| 0041887 | 12/1981 | European Pat. Off. . |
| 2568843 | 2/1986 | France . |
| 47-30039 | 11/1972 | Japan . |
| 54-15232 | 2/1979 | Japan . |
| 56-38430 | 9/1981 | Japan . |
| 56-174363 | 12/1981 | Japan . |
| 57-30663 | 2/1982 | Japan . |
| 58-156459 | 9/1983 | Japan . |
| 61-43229 | 9/1986 | Japan . |

Primary Examiner—Robert E. Garrett
Assistant Examiner—Mark A. Williamson
Attorney, Agent, or Firm—Foley & Lardner, Schwartz, Jeffery, Schwaab, Mack, Blumenthal & Evans

[57] ABSTRACT

A power assist steering system comprises a control valve which defines a fluid flow distributor circuit which includes two parallel first and second fluid flow paths connected between the hydraulic fluid source and the fluid reservoir. Inflow control variable flow orifices are arranged in series with two auxiliary variable flow orifices, respectively, which are disposed downstream with regard to the power cylinder, and the outflow control variable flow orifices are arranged in series with another two auxiliary variable flow orifices which are disposed downstream with regard to the power cylinder.

3 Claims, 10 Drawing Sheets

OPERATING NOISE-FREE FLUID FLOW DISTRIBUTOR CIRCUIT FOR VARIABLE ASSIST POWER STEERING SYSTEM

RELATED APPLICATIONS

The following two U.S. patent applications have been already filed and assigned to the same assignee of the present application.

(1) U. S. patent application Ser. No. 044,065, filed on Apr. 29, 1987, now claiming priority based on Japanese Patent Application No. 61-109293 filed on May 12, 1986 and on Japanese Patent application No. 61-228456 filed on Sept. 29, 1986, (Our Ref.: U137-86).

(2) U.S. patent application Ser. No. 102,412, filed on Sept. 29, 1987, now pending, (Our Ref.: U040-87).

The following five U.S. patent applications have been concurrently filed on Dec. 28, 1987 and assigned to the same assignee of the present application.

(3) U.S. patent application Ser. No. 138,480, claiming priority based on Japanese Patent Application No. 61-313519 with a filing date of Dec. 27, 1986, (our ref.: U097-87).

(4) U.S. patent application Ser. No. 138,490, claiming priority based on Japanese Patent Application No. 61-313521 with a filing date of Dec. 27, 1986, (our ref.: U098-87).

(5) U.S. patent application Ser. No. 138419, claiming priority based on Japanese Patent Application No. 61-313518 with a filing date of Dec. 27, 1986, (our ref.: U099-87).

(6) U.S. patent application Ser. No. 138402, claiming priority based on Japanese Patent Application No. 61-313520 with a filing date of Dec. 27, 1986, (our ref.: U100-87).

(7) U.S. patent application Ser. No. 138345, claiming priority based on Japanese Patent Application No. 61-313517 with a filing date of Dec. 27, 1986, (our ref.: U101-87).

The following three U.S. patent applications have been concurrently filed and assigned to the same assignee of the present application.

(8) U.S. patent application Ser. No. 151,127, claiming priority based on Japanese Patent Application No. 62-19787 with a filing date of Jan. 30, 1987, (our ref.: U102-87).

(9) U.S. patent application Ser. No. 150,949, claiming priority based on Japanese Patent Application No. 62-19784 with a filing date of Jan. 30, 1987, (our ref.: U132-87).

(10) U.S. patent application Ser. No. 151,122, claiming priority based on Japanese patent Applications No. 62-19785 with a filing date of Jan. 30, 1987 amd No. 62-19786 with a filing date of Jan. 30, 1987, (our ref.: U134-87).

BACKGROUND OF THE INVENTION

The present invention relates to a variable power assist steering system and more particularly to a variable power assist steering system employing an operating noise free fluid flow distributor circuit.

EP No. 0 041 887 B1 (corresponding to JP No. 57-30663 A1) discloses a fluid flow distributor circuit for a power assist steering system. This known fluid flow distributor circuit includes two parallel branch fluid paths, each being provided with two kinds of variable flow orifices connected in series. One kind of these variable flow orifices varies its flow area in inverse proportion to a steering torque during clockwise turning of a steering wheel, while the other kind varies its flow area in inverse proportion to steering torque during counterclockwise rotation of the steering wheel. A power cylinder has cylinder chambers connected to the two fluid paths at cylinder connection ports disposed between the two kinds of variable flow orifices. In order to prevent formation of cavitation in liquid flow, a bypass circuit including an auxiliary variable flow orifice and a fixed orifice connected in series is arranged in parallel to the main variable flow orifices disposed downstream of the cylinder connection port of each of the branchfluid paths. The auxiliary variable flow orifice is designed such that it varies its flow area in inverse proportion to steering torque during the same rotation of the steering wheel as the rotation of the steering wheel during which the associated main variable flow orifice varies its flow area in inverse proportion, but the former decreases its flow area to the mimimum after the latter has decreased its orifice area to the minimum as steering torque increases. This circuit arrangement is found to be effective in preventing noise resulting from forming of cavitation in hydraulic fluid flow passing through the fluid flow distributor circuit.

However, with this circuit arrangement, it is not possible to vary power assistance with variation of vehicle speed. Since the degree of power assistance is determined by characteristics of the auxiliary variable flow orifice valve that is designed to be closed at a relatively large steering torque, it is not possible to produce a sufficient degree of power assistance.

An object of the present invention is to provide a power steering system which, without any operating noise, has power assitance change with vehicle speed or any other variable.

SUMMARY OF THE INVBENTION

According to the present invention, at least one auxiliary variable flow orifice is arranged in series with the adjacent one of two main variable flow orifices provided in each of parallel branch fluid paths of a fluid flow distributor circuit, and a bypass path is arranged in parallel with said the adjacent one main variable flow orifice, and the bypass path is provided with an externally controlled variable flow orifice which can vary its flow area in response to some variable other than a variable on which all of the main and auxiliary variable flow orifices vary their orifice areas.

DETAILED DESCRIPTION OF THE INVENTION

Figure 1:
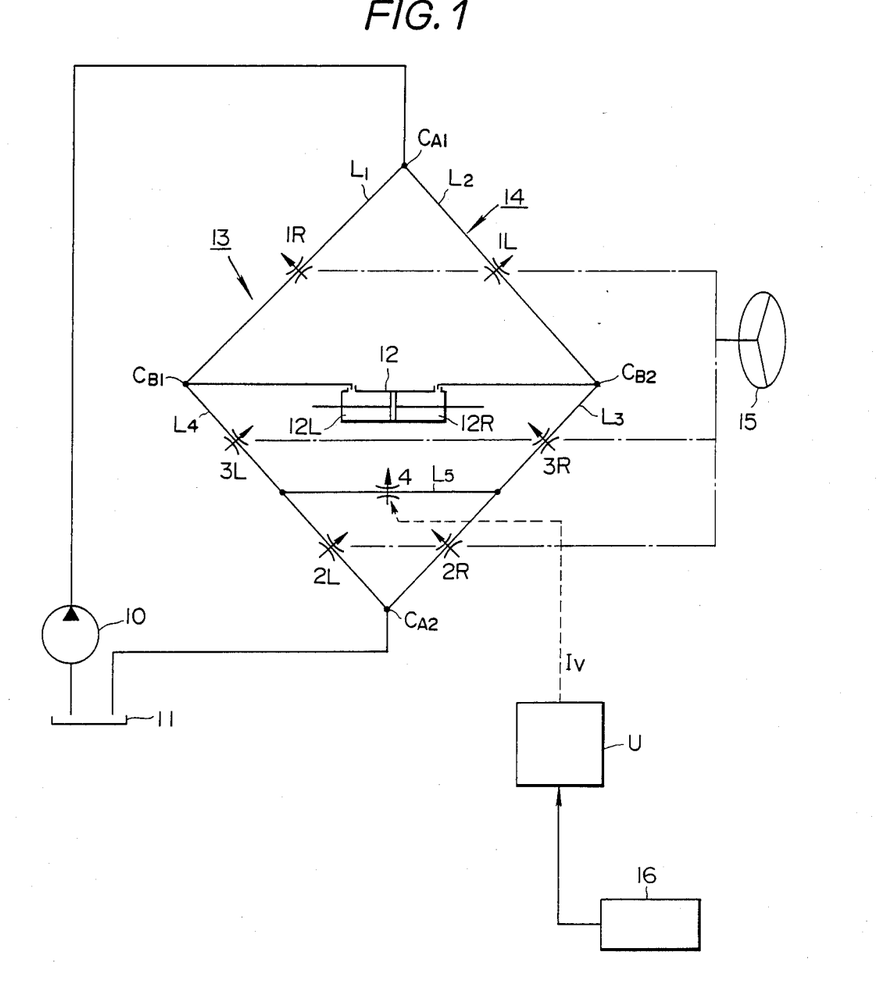
FIG. 1 is a circuit diagram of a fluid flow distributor circuit of a power steering control valve.

Referring to FIG. 1, a first embodiment of a hydraulic fluid pressure control system is shown in operative connection with a power cylinder 12 of a power assist steering system.

The control system includes an oil pump 10, as a hydraulic fluid source, a tank 11, as a fluid reservoir, and a power steering control valve 13 employing a fluid flow distributor circuit 14 of the open center type. Also shown are a steering wheel 15, a vehicle speed sensor 16 and a control unit U.

Figure 2:
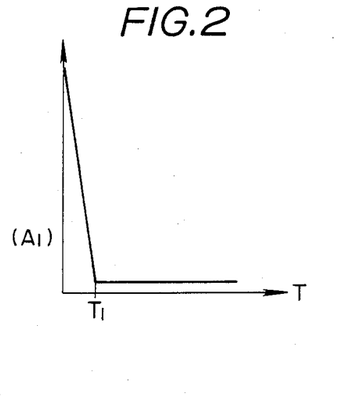
FIG. 2 shows a pattern in which an orifice flow area ($A_1$) of an inflow control variable flow orifice (1R or 1L) decreases as a steering torque (T) increases.
Figure 3:
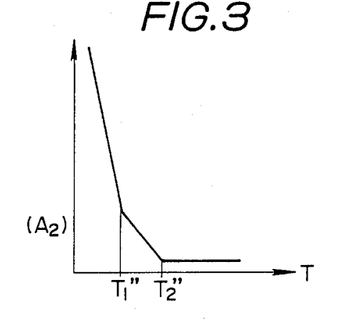
FIG. 3 shows a pattern in which an orifice flow area ($A_2$) of an outflow control variable flow orifice (2R or 2L) decreases as steering torque (T) increases.
Figure 4:
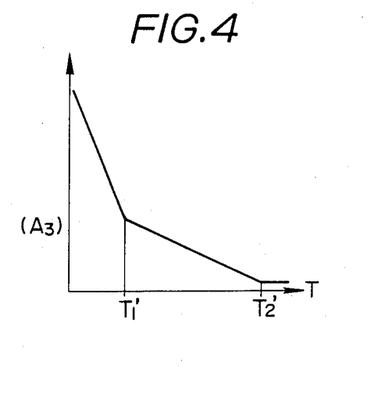
FIG. 4 shows a pattern in which an orifice flow area ($A_3$) of an outflow control variable flow orifice (3R or 3L) decreases as steering torque (T) increases.

The fluid flow distributor circuit 14 includes two parallel fluid flow paths, namely, a first fluid flow path $L_1$–$L_4$ and a second fluid flow path $L_2$–$L_3$, connected between a pump fluid supply port $C_{A1}$ and a fluid return port $C_{A2}$. The first fluid flow path $L_1$–$L_4$ has a cylinder connection port $C_{B1}$ connected to a left turn cylinder chamber 12L of the power cylinder 12, while the second fluid flow path $L_2$–$L_3$ has a cylinder connection port $C_{B2}$ connected to a right turn cylinder chamber 12R of the power cylinder 12. Thus, the first fluid flow path may be divided into an upstream flow path section $L_1$ and a downstream flow path section $L_4$ with regard to the cylinder connection port $C_{B1}$. Similarly, the second fluid flow path may be divided into an upstream flow path section $L_2$ and a downstream flow path section $L_3$ with regard to the cylinder connection port $C_{B2}$. The first fluid flow path $L_1$–$L_4$ includes an inflow control variable flow orifice 1R of the first kind which has an orifice area $A_1$ decreasing as input torque T increases when the steering wheel 15 is turned clockwise from a central rest position so as to restrict fluid flow into the left turn cylinder chamber 12L of the power cylinder 12, and two series outflow control variable flow orifices 2L and 3L of the second kind which have orifice areas $A_2$ and $A_3$ decreasing as steering torque T increases when the steering wheel 15 is turned counterclockwise from the central rest position so as to restrict fluid flow out of the left turn cylinder chamber 12L of the power cylinder 12. The second fluid flow path $L_2$–$L_3$ includes an inflow control variable flow orifice 1L of the second kind which has an orifice area $A_1$ decreasing as the steering torque T increases when the steering wheel 15 is turned counterclockwise from the central rest position so as to restrict fluid flow into the right turn cylinder chamber 12R of the power cylinder 12, and two series outflow control variable flow orifices 2R and 3R of the second kind which have orifice areas $A_2$ and $A_3$ decreasing as the steering torque T increases when the steering wheel 15 is turned cockwise from the central rest position so as to restrict fluid flow out of the right turn cylinder chamber 12R of the power cylinder 12. The orifice area $A_1$ of the inflow control variable flow orifice 1R of the first kind decreases in the pattern as shown in FIG. 2 during clockwise turning of the steering wheel 15, while the orifice areas $A_2$ and $A_3$ of the outflow control variable flow orifices 2R and 3R of the first kind decrease in the patterns as shown in FIGS. 3 and 4 during clockwise turning of the steering wheel 15. The orifice area $A_1$ of the inflow control variable flow orifice 1L of the second kind decreases in the pattern as shown in FIG. 2 during counterclockwise turning of the steering wheel 15, while the orifice areas $A_2$ and $A_3$ of the outflow control variable flow orifices 2L and 3L of the second kind decrease in the patterns as shown in FIGS. 3 and 4 during counterclockwise turning of the steering wheel 15.

Figure 5:
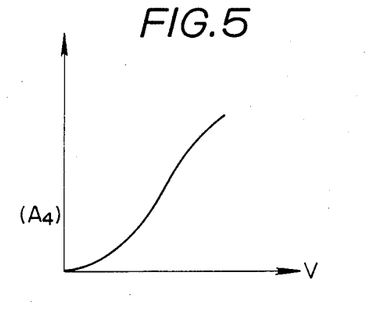
FIG. 5 shows a pattern in which an orifice flow area ($A_4$) of an externally controlled variable flow orifice (4) varies as vehicle speed (V) varies.

The control valve 13 also includes an externally controlled variable flow orifice 4 arranged in a bypass path $L_5$ which is arranged to bypass the outflow control variable flow orifices 2R and 2L. The externally controlled variable orifice 4 is controlled by the control unit U in response to a vehicle speed V detected by the vehicle speed sensor 16. The control unit U regulates electric current supplied to a solenoid operated valve, not shown, which defines and varies the flow area $A_4$ of the externally controlled variable orifice 4 in response to the output of the vehicle speed sensor 16. The flow area $A_4$ of the externaly controlled variable flow orifice 4 is substantially zero at zero or low vehicle speeds near zero and varies in proportion to vehicle speed V in the pattern as shown in FIG. 5.

Referring to FIG. 1, the operation of the fluid flow distributor circuit 14 is explained. Let us assume that the vehicle is at a standstill and the steering wheel 15 is in the central rest position. Under these conditions, all of the variable flow orifices 1R, 3L and 2L disposed in the first fluid flow path $L_1$–$L_4$ are opened to allow unrestricted fluid flow, and all of the variable flow orifices 1L, 3R and 2R of the second fluid flow path $L_2$–$L_3$ are opened to allow unrestricted fluid flow. The externaly controlled variable flow orifice 4, however, is closed and thus the bypass path $L_5$ is closed. The fluid under pressure from the pump 10 is divided evenly through the first fluid path $L_1$–$L_4$ in one direction and through the second fluid flow path $L_2$–$L_3$ in the opposite directions. Thus, there occur no pressure acting on the front power cylinder 12 and the rear power cylinder 18.

Let us consider the case where the steering wheel 15 is in the central rest position at a high vehicle speed so that the externally controlled variable flow orifice 4 is fully opened. Under these conditions also, the fluid under pressure from the pump 10 is divided evenly through the first fluid flow path $L_1$–$L_4$ in one direction and through the second fluid flow path $L_2$–$L_3$ in the opposite direction. Thus, no pressure difference takes place in the power cylinder 12.

In turning the steering wheel 15 clockwise from the central rest position at zero vehicle speed, the inflow control variable flow orifice 1R decreases its flow area $A_1$ in response to steering torque T in the pattern as shown in FIG. 2, the outflow control variable flow orifices 3R and 2R decreases their flow areas $A_3$ and $A_2$ in response to steering torque T in the patterns as shown in FIGS. 4 and 3, whereas the variable flow orifices 1L, 3L and 2L are opened. Under these conditions, the variable flow orifices 1R, 3R and 2R effect a throttling of the fluid path inducing a pressure drop which in turn results in a pressure increase in the right turn cylinder chamber 12R of the power cylinder 12. Thus, there is created pressure difference between the right turn cylinder chamber 12R and the left turn cylinder chamber 12L, causing the rod of the power cylinder 12 to displace toward the left as viewed in FIG. 1. Dduring this turning operation under these conditions, the orifice area ($A_1$) of the inflow control variable flow orifice 1R is decreased to substantially zero when the steering torque T reaches a relatively small value $T_1$ as will be understood from FIG. 2. At steering torque $T_1$, a pressure drop at the inflow control variable flow orifice 1R is not large because the orifice areas $A_3$ of the outflow control variable flow orifices 3R and 2R remain still large enough to suppress a pressure increase created between the inflow control variable flow orifice 1R and the outflow control variable flow orifice 3R. Thus, the operating noise due to the pressure drop at the inflow control variable flow orifice 1R is little and negligible. If the steering torque increases beyond the value $T_1$, the pressure difference between the cylinder connection port $C_{B2}$ and the fluid return port $C_{A2}$ becomes great. However, the pressure drop which induces this pressure difference is effected by the outflow control variable flow orifices 3R and 2R which are connected in series so that pressure drops taking place at these outflow control variable flow orifices are suppressed to such low levels as not to induce cavitation pheniomena. More specifically, as will be understood from FIGS. 3 and 4, the outflow control variable flow orifice 3R starts effecting substantial throttling of the fluid flow therethrough when the outflow control variable flow orifice 2R is about to be closed in response to the steering torque T falling between $T_1''$ and $T_2''$. This is effective in preventing the occurrence of a large pressure drop at the outflow control variable flow orifice 2R which induces formation of cavitation which results in producing operating noise. It has been confirmed that operating noise begins to be produced at the outflow control variable flow orifice 2R when the pressure at this orifice increases beyond about 40 kg/mm$_2$. Thus, the setting should be such that the pressure at the outflow control variable flow orifice 3R reaches about 0.5 kg/mm$_2$ when the pressure at the variable flow orifice 2R is at about 40 kg/mm$_2$.

Let us now consider how the fluid flow distributor circuit 14 works at high vehicle speed. In this case, the externally controlled variable flow orifice 4 is fully opened and the outflow control variable flow orifice 2R is bypassed. Thus, the provision of the outflow control variable flow orifice 2R is negligible. In turning the steering wheel 15 clockwise, the outfow control variable flow orifices 3L and 2L are opened and thus the left turn cylinder chamber 12L is in substantially direct communication with the reservoir 11, whereas the inflow control variable flow orifice 1R and outflow control variable flow orifice 3R are restricted and effect a throttling of the fluid path, inducing a pressure drop which in turn results in a pressure increase in the right turn cylinder chamber 12R of the power cylinder 12. The pressure increase in the right turn cylinder chamber 12R is considerably less and thus a power assist is less at high vehicle speeds.

Figure 7:
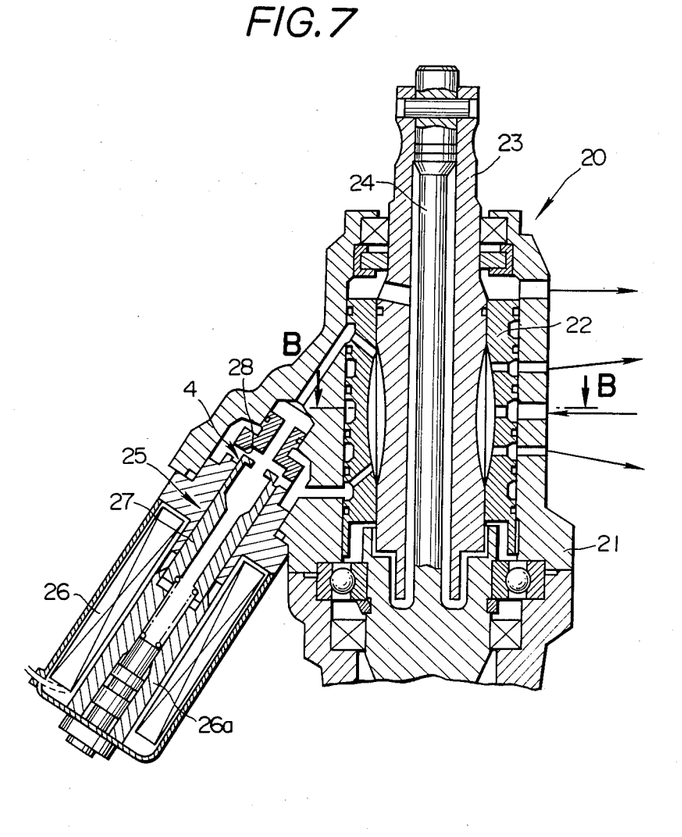
FIG. 7 is a sectional view of a rotary control valve employing the fluid flow distributor circuit shown in FIG. 1.
Figure 8:
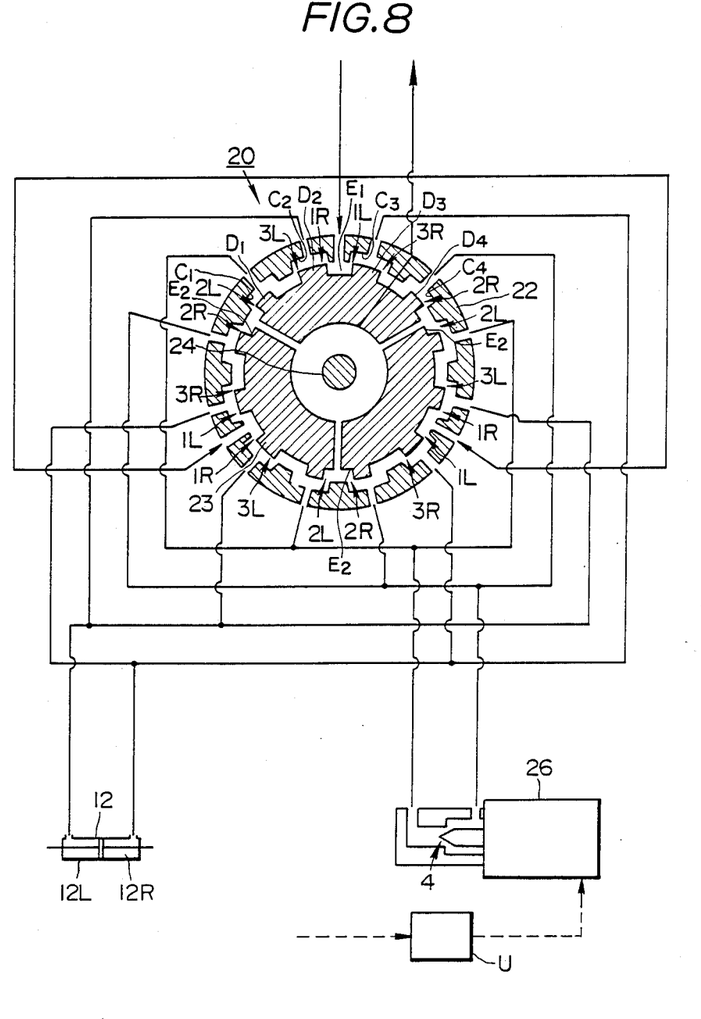
FIG. 8 is a section taken along the line B—B of FIG. 7.

Referring to FIGS. 7 and 8, it will be explained how the fluid flow distributor circuit 14 described in connection with FIG. 1 is defined by two relatively displaceable valve elements of a rotary control valve 20.

The rotary valve 20 includes a housing 21 which receives a valve sleeve 22 connected to a pinion of a rack and pinion type steering gear. Rotatably disposed in the valve sleeve 22 is an inner valve 23 connected to a steering wheel 15 (see FIG. 1). Received by the inner valve 23 is a torsion bar 24 having one end connected to the steering wheel 15 and an opposite end connected to the pinion of the steering gear.

Referring to FIG. 8, three sets of such control valves 13 as illustrated in FIG. 1 are arranged in a circular fashion, with each control valve 13 comprising approximately 120° of the circle.

Each control valve 13 is formed by four longitudinally extending inner grooves $C_1$ and $C_4$ formed in the inner wall of the valve sleeve 22 and four lands $D_1$ to $D_4$ formed in the outer peripheral wall of the inner valve 23 and lying opposite to the inner grooves $C_1$ to $C_4$, respectively. As viewed in FIG. 8, an outflow control variable flow orifice 2R is formed between counterclockwise mating edges of the inner groove $C_1$ and land $D_1$, an outflow control variable flow orifice 3L between the counterclockwise mating edges of the inner groove $C_2$ and land $D_2$, an inflow control variable flow orifice 1R between the clockwise mating edges of the inner groove $C_2$ and land $D_2$, an inflow control variable flow orifice 1L between the counterclockwise mating edges of the inner groove $C_3$ and land $D_3$, an outflow control variable flow orifice 3R beween the clockwise mating edges of the inner groove $C_3$ and land $D_3$, and outflow control variable flow orifice 2R between the clockwise mating edges of the inner groove $C_4$ and land $D_4$. It is to be noted that the clearance formed between the clockwise mating edges of the inner groove $C_1$ and land $D_1$ and the clearance formed between the counterclockwise mating edges of the inner groove $C_4$ and land $D_4$ are sufficiently wide so that they will not serve as a variable flow orifice during relative rotation of the inner valve 23 with regard to the valve sleeve 22.

Formed between the lands $D_2$ and $D_3$ is a groove $E_1$ which is in connection with a pump 10 via a radial opening formed through the valve sleeve 22. Formed between the lands $D_4$ and $D_1$ is a groove $E_2$ which is in connection with a fluid reservoir 11 via a fluid passage formed through the inner valve 23. The inner grooves $C_2$ and $C_3$ are in direct connection with left turn and right turn cylinder chambers 12L and 12R of a power cylinder 12. The inner grooves $C_1$ and $C_4$ are connected to an externally controlled variable flow orifice 4 which is described later in detail.

Referring again to FIG. 7, a spool valve type externally controlled variable orifice valve 25 is formed in the valve housing 21 of the rotary valve 20. This valve 25 includes a spool 27 operatively connected to a plunger 26a of a solenoid operated actuator 26. The outer peripheral wall at the leading end of the spool 27 and a groove 28 cooperate to define the externally controlled variable flow orifice 4.

Figure 9:
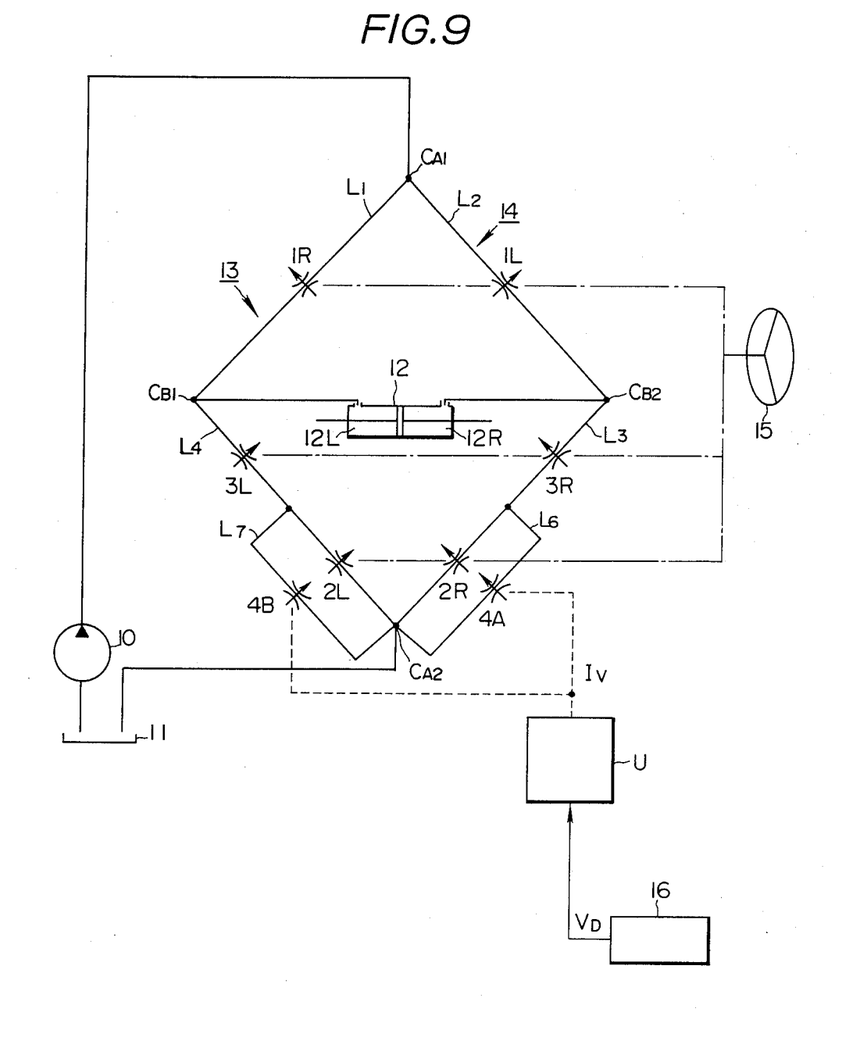
FIGS. 9 and 10 are modifications of FIG. 1 embodiment.
Figure 10:
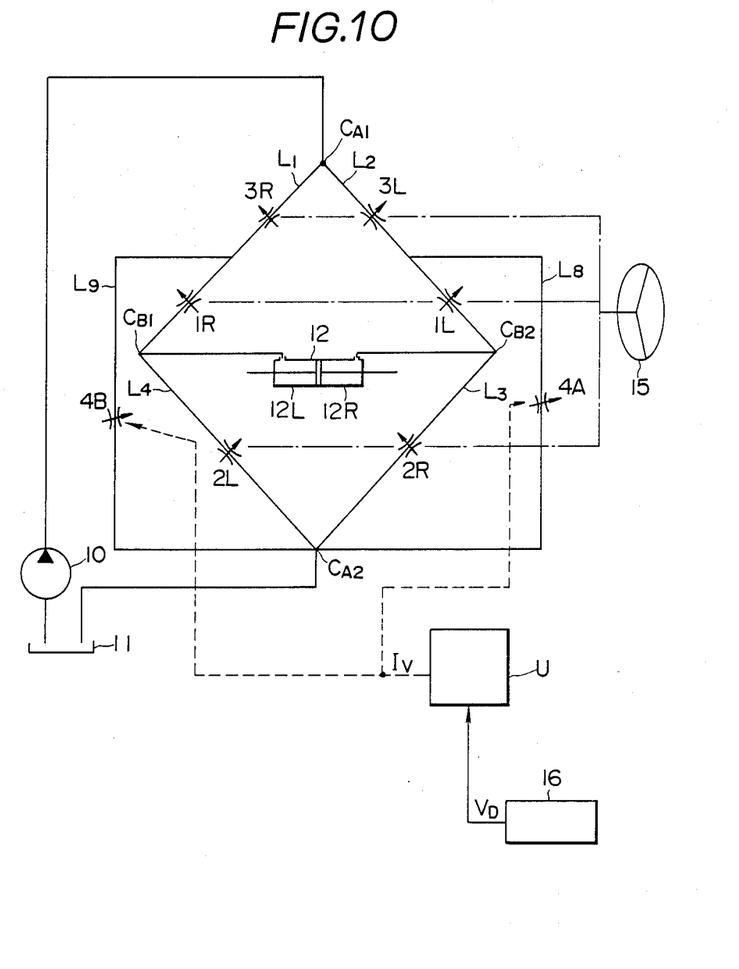

In the embodiment shown in FIG. 1, the bypass path $L_5$ has one end connected to the fluid path $L_3$ and an opposite end connected to the fluid path $L_4$ in order to bypass the variable flow orifices 2R and 2L. Alternatively, two bypass paths $L_6$ and $L_7$ are arranged in parallel to outflow control variable flow orifices 2R and 2L, respectively, and two externally controlled variable flow orifices 4A and 4B of the same character are provided in these bypass paths $L_5$ and $L_7$, respectively, as shown in FIG. 9. The variable flow orifices 3R and 3L which have been used as outflow control variable orifices may be arranged upstream of the inflow control variable flow orifices 1R and 1L. In this case, two bypass pathes provided with externally controlled variable flow orifices are arranged in parallel to the inflow control variable flow orifices 1R and 1L, respectively. Such bypass paths may be arranged in parallel to outflow control variable flow orifices 2R and 2L as shown in FIG. 10. In this modification, the bypass paths $L_8$ and $L_9$ have their downstream ends directly connected to a fluid reservoir 11. In FIG. 10, the variable flow orifices 3R ad 3L are arranged upstream of the variable flow orifices 1R and 1L, respectively, so that the occurence of cavitation at the variable flow orifices 1R and 1L is prevented or at least suppressed.

Figure 6:
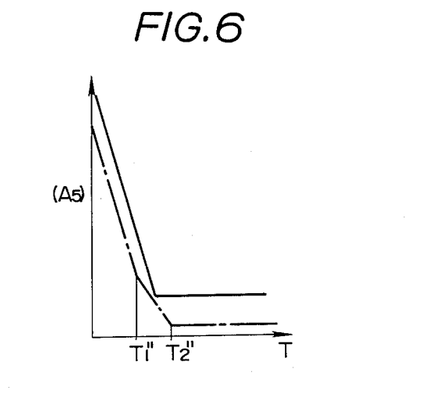
FIG. 6 shows in the fully drawn line a pattern of variation of a variable flow orifice (5R or 5L) and in the phantom line the pattern shown in FIG. 3.
Figure 11:
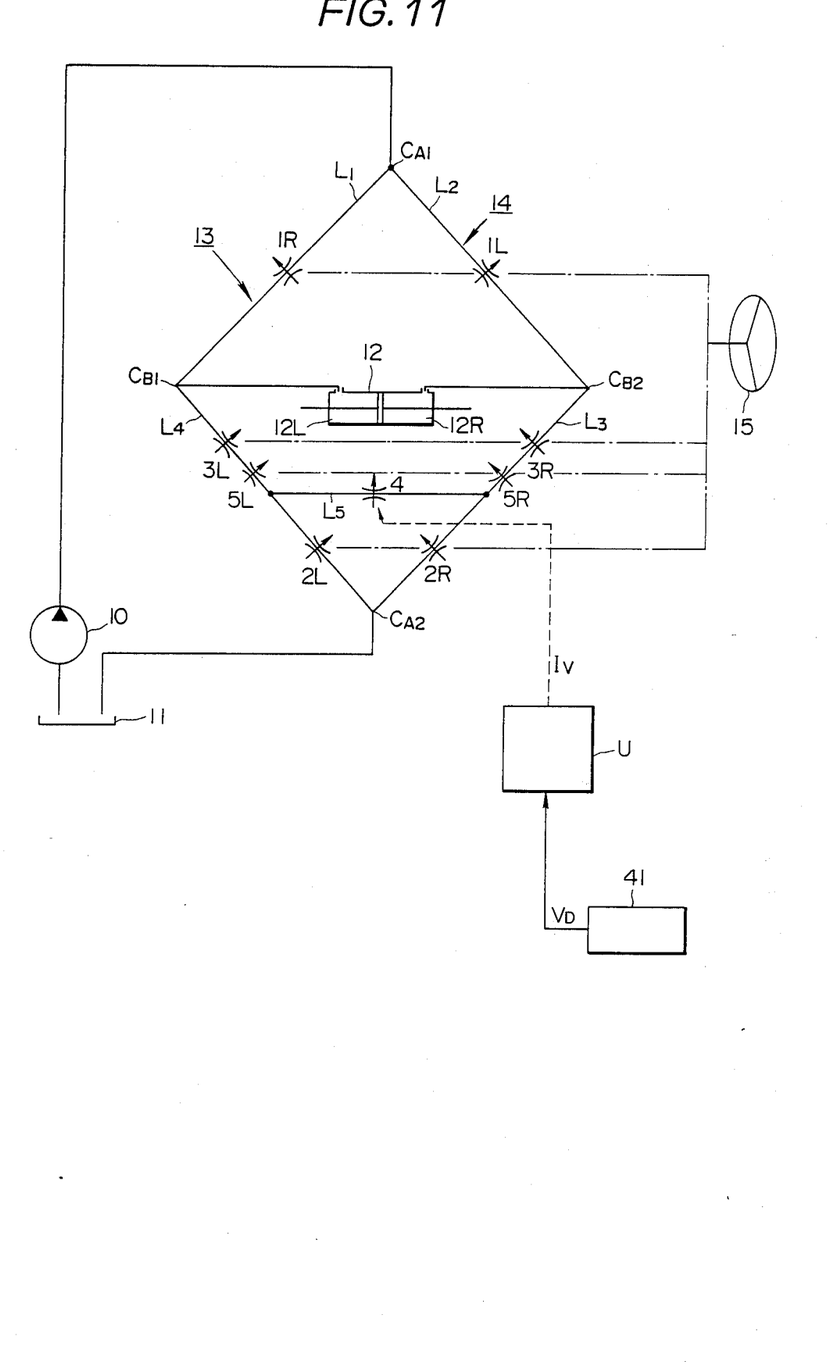
FIG. 11 is a circuit diagram showing another embodiment according to the present invention.

The embodiment shown in FIG. 11 is described. This embodiment is different from the first embodiment shown in FIG. 1 only in that a variable flow orifice 5R is arranged between variable flow orifices 3R and 2R and upstream of a portion where one end of a bypass path $L_5$ is connected to a fluid path $L_3$, while another variable flow orifice 5L is arranged between variable flow orifices 3L and 2L and upstream of a portion where the opposite end of the bypass path $L_5$ is connected to the bypass path $L_4$. The orifice area ($A_5$) of the variable flow orifices 5R and 5L decreases in response to increasing steering torque in the pattern as shown by the fully drawn line in FIG. 6. Referring to FIG. 6, it will be understood that the variable flow orifice 5R or 5L starts effecting a throttling of the fluid path immediately before the pressure drop at the associated variable flow orifice 2R or 2L causes the formation of cavitation. Since in this embodiment, three variable flow orifices 3R, 5R and 2R or 3L, 5L and 2L are arranged in series to cause a gradual pressure reduction to the level of the fluid reservoir 11, formation of cavitation is prevented.

Figure 12:
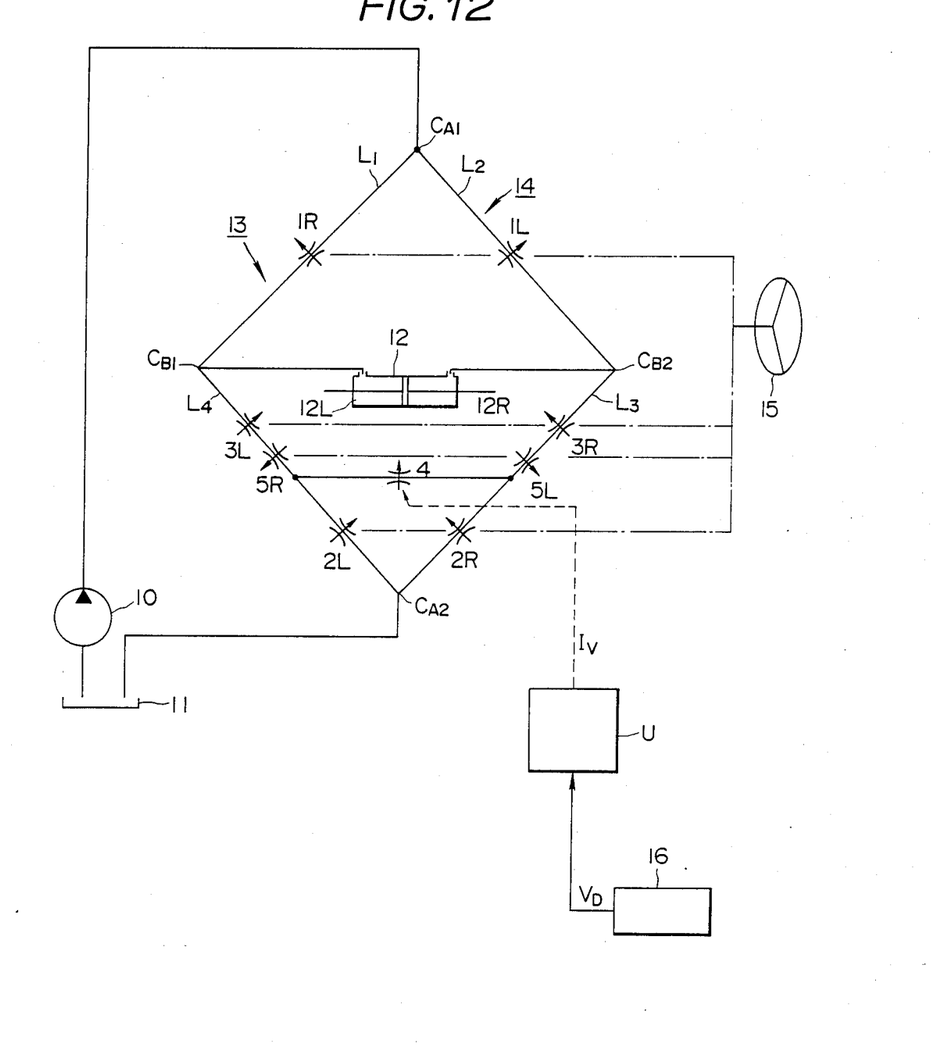
FIG. 12 is a circuit daigram showing a further embodiment according to the present invention.
Figure 13:
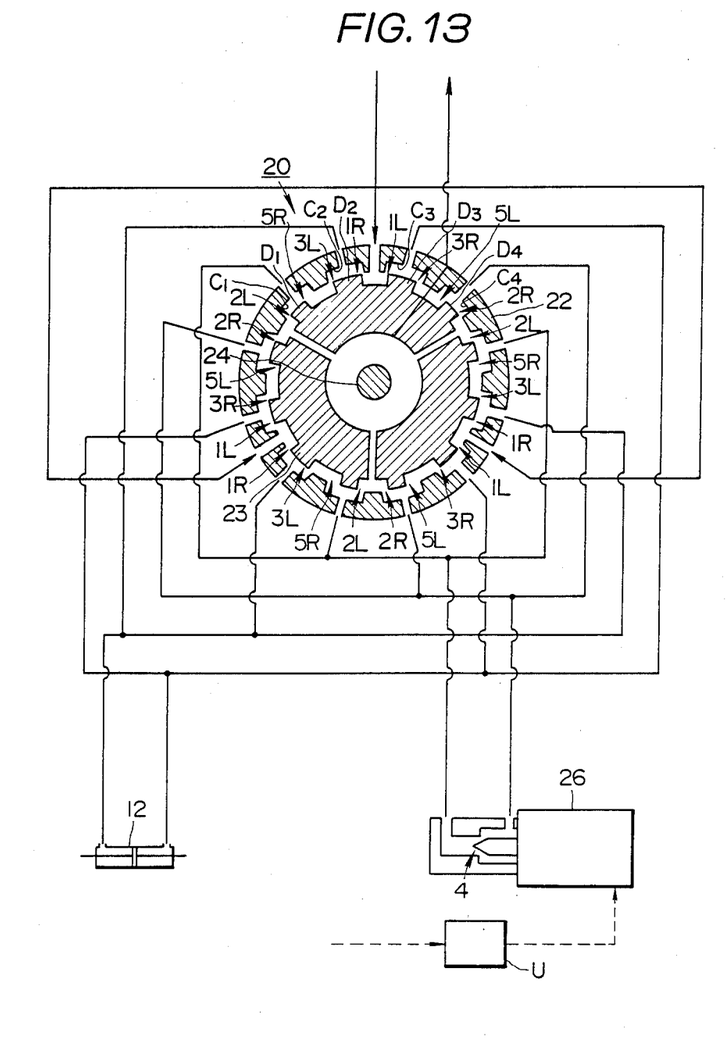
FIG. 13 is a cross sectional diagram of a rotary control valve employing the fluid flow distributor circuit shown in FIG. 12.

FIG. 12 shows another embodiment which is different from the previously described embodiment of FIG. 11 in that a variable flow orifice 5R and another variable flow orifice 5L are reversed. In other words, for the fluid flow path $L_1$–$L_4$, the variable flow orifice 5R is arranged in series with an inflow control variable flow orifice 1R, while, for the fluid flow path $L_2$–$L_3$, the variable flow orifice 5L is arranged in series with an inflow control variable flow orifice 1L. With this arrangement, formation of cavitation at each of the inflow control variable flow orifices 1R and 1L is also prevented. FIG. 13 shows where the newly added variable flow orifices 5R and 5L are formed between an inner valve 23 and the surrounding valve sleeve 22. The variable flow orifice 5R is formed between the clockwise mating edge of an inner groove $C_1$ and a land $D_1$ and the variable flow orifice 5L between the counterclockwise mating edges of an inner groove $C_4$ and a land $D_4$. From comparison of FIG. 13 with FIG. 8, it will be appreciated that the variable flow orifices 5R and 5L are formed without any substantial modification of hte structure shown in FIG. 8.

Figure 14:
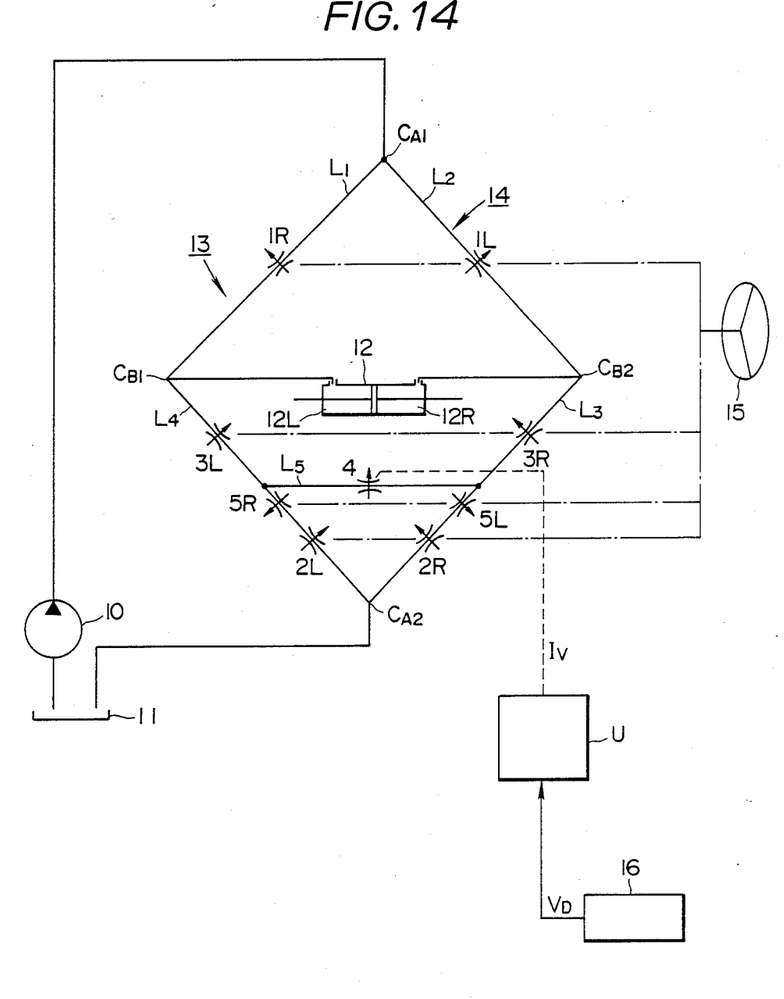
FIG. 14 is a circuit diagram showing a still further embodiment according to the present invention.

FIG. 14 shows further ambodiment which is different from the previous embodiment of FIG. 12 only in the location of the variable flow orifices 5R and 5L with regard to bypass path $L_5$. In the case of FIG. 12, the variable flow orifices 5R and 5L are not bypassed, whereas in the case of FIG. 14, the variable flow orifices 5R and 5L are arranged to be bypassed by the bypass path $L_5$.

In the previously embodiments, the vehicle speed V is used as a variable on which the externally controlled variable flow orifice varies its orifice area. However, some other variable except the vehicle speed and steering torque may be used. For example, the variable flow orifice may be controlled in response to road friction whereby the power assist characteristic is changed depending on the road conditions.

What is claimed is

1. A power assist steering system including a hydraulic fluid source, a fluid reservoir, and a hydraulic pressure operated power cylinder, comprising:

a control valve which defines a fluid flow distributor circuit which includes two parallel first and second fluid flow paths connected between the hydraulic fluid source and the fluid reservoir and includes an inflow control variable flow orifice and an outflow control variable flow orifice arranged in each of the parallel fluid flow paths to produce a pressure difference in the power cylinder in response to a first predetermined variable, the inflow and outflow control variable flow orifices varying their orifice flow areas depending on the first predetermined variable, wherein at least one of said inflow and outflow variable flow orifices is connected in series with at least one auxiliary variable flow orifice which effects a throttling before said at least one of said inflow and outflow variable flow orifices is substantially closed, and an externally controlled variable flow orifice is arranged in parallel to said at least one of said inflow and outflow control variable flow orifices.

2. A power assist steering system as claimed in claim 1, wherein each of said inflow and outflow control variable flow orifices is arranged in series with an auxiliary variable flow orifice.

3. A power assist steering system as claimed in claim 1, wherein said inflow control variable flow orifices are arranged in series with two auxiliary variable flow orifices, respectively, which are disposed downstream with regard to the power cylinder, and said outflow control variable flow orifices are arranged in series with another two auxiliary variable flow orifices which are disposed downstream with regard to the power cylinder.

* * * * *